United States Patent
Aoun et al.

(10) Patent No.: US 12,369,536 B2
(45) Date of Patent: Jul. 29, 2025

(54) PLANT GROWTH MONITORING SYSTEM AND METHOD

(71) Applicant: SIGNIFY HOLDING B.V., Eindhoven (NL)

(72) Inventors: Marc Aoun, Eindhoven (NL); Marcellinus Petrus Carolus Michael Krijn, Eindhoven (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 219 days.

(21) Appl. No.: 17/801,602

(22) PCT Filed: Feb. 23, 2021

(86) PCT No.: PCT/EP2021/054369
§ 371 (c)(1),
(2) Date: Aug. 23, 2022

(87) PCT Pub. No.: WO2021/170547
PCT Pub. Date: Sep. 2, 2021

(65) Prior Publication Data
US 2023/0102916 A1     Mar. 30, 2023

(30) Foreign Application Priority Data
Feb. 27, 2020  (EP) .................................. 20159800

(51) Int. Cl.
*A01G 9/24* (2006.01)
*G06V 20/10* (2022.01)

(52) U.S. Cl.
CPC ............. *A01G 9/246* (2013.01); *A01G 9/249* (2019.05); *G06V 20/188* (2022.01)

(58) Field of Classification Search
CPC . A01G 7/04; A01G 7/045; A01G 9/24; A01G 9/246; A01G 9/249; G06V 20/188
(Continued)

(56) References Cited

U.S. PATENT DOCUMENTS 3,831,450 A  *  8/1974  Schipke .................. G08B 21/18
                                                        374/102
10,492,374 B2 * 12/2019  Regan ....................... A01G 7/00
(Continued)

FOREIGN PATENT DOCUMENTS

CN    106645155 A    5/2017
CN    107817851 A    3/2018
(Continued)

OTHER PUBLICATIONS

Angus, John et al., "Chapter 14—Temperature and acclimation", 2016, Australian Society of Plant Scientists, p. 9-12; https://www.asps.org.au/wp-content/uploads/Chapter-14-Temperature-and-acclimation-for-PDF.pdf (Year: 2016).*
(Continued)

*Primary Examiner* — Kimberly S Berona
*Assistant Examiner* — Erica Michelle Huebner

(57) ABSTRACT

A plant growth monitoring system comprises an image capture system for capturing images over time of a plant being monitored. The images are used to derive successive time instants corresponding to predetermined growth states of the plant. A temperature exposure parameter is obtained between the successive time instants, based on a monitored temperature vs. time function. Information relating to a plant health is derived from the temperature exposure parameter.

15 Claims, 2 Drawing Sheets

(58) Field of Classification Search
USPC .............................................................. 47/17
See application file for complete search history.

(56) References Cited

U.S. PATENT DOCUMENTS

| | | | |
|---|---|---|---|
| 2016/0278300 A1* | 9/2016 | Clendinning | A01G 9/20 |
| 2017/0161560 A1* | 6/2017 | Itzhaky | G06V 20/188 |
| 2018/0184602 A1* | 7/2018 | Ofir | A01G 25/167 |

FOREIGN PATENT DOCUMENTS

| | | | | |
|---|---|---|---|---|
| CN | 207519220 U | | 6/2018 | |
| CN | 109142359 A | | 1/2019 | |
| EP | 3326452 A1 | | 5/2018 | |
| KR | 101250414 B1 | * | 4/2013 | ............... A01C 1/02 |
| KR | 20180027778 A | | 3/2018 | |
| KR | 20180055604 A | | 5/2018 | |
| WO | 2015006675 A2 | | 1/2015 | |
| WO | 2016147870 A1 | | 9/2016 | |
| WO | WO-2019075179 A1 | * | 4/2019 | ............... A01C 7/00 |
| WO | WO-2019211853 A1 | * | 11/2019 | ........... A01B 79/005 |

OTHER PUBLICATIONS

Kuei-Chung Chang, et al., "Design of Persimmon Growing Stage Monitoring System Using Image Recognition Technique", 2016 International Conference on Consumer Electronics—Taiwan, pp. 1-2.

Unseok Lee, et al., "An Automated, High-Throughput Plant Phenotyping System Using Machine Learning-Based Plant Segmentation and Image Analysis", PLOS One, Apr. 27, 2018, pp. 1-17.

Zhenghong Yu, et al., "Automatic Image-Based Detection Technology for Two Critical Growth Stages of Maize: Emergence and Three-Leaf Stage", Agricultural and Forest Meteorology, 2013, pp. 65-84.

* cited by examiner

PLANT GROWTH MONITORING SYSTEM AND METHOD

CROSS-REFERENCE TO PRIOR APPLICATIONS

This application is the U.S. National Phase application under 35 U.S.C. § 371 of International Application No. PCT/EP2021/054369, filed on Feb. 23, 2021, which claims the benefit of European Patent Application No. 20159800.0, filed on Feb. 27, 2020. These applications are hereby incorporated by reference herein.

FIELD OF THE INVENTION

The invention relates to monitoring the growth of plants in environments such as vertical farms and greenhouses.

BACKGROUND OF THE INVENTION

Monitoring plant growth progress (e.g. appearance of new leaves, counting new leaves, etc. . . . ) by human inspection is complex and labor intensive.

It is known to monitor plant growth with local sensors, in order to provide automated control of a climate management system and/or to report when issues arise. It is for example known to use sensors or 2D or 3D cameras to capture time-lapsed information. For example, cameras may be used to capture time-lapsed images from which measurements may be made, such as plant height, leaf count, leaf color, leaf width, etc.

An automated decision module may then be used to adapt the control parameters of a climate management system in order to ensure a growth that follows specified guidelines such as expected development rate. The decision module can also generate alerts based on a detected divergence of growth from a set of specified expected growth guidelines.

There are various characteristics which can be monitored during the development of a plant, in order to assess whether or not the growth is following the expected development rate. By way of further example, the interval between the formation of individual new leaves along a stem for a given plant remains rather constant when the plant is growing normally, under stable environmental conditions (e.g. temperature, light).

The article "Automatic image-based detection technology for two critical growth stages of maize: Emergence and three-lead stage" of Zhenghong Yu et. al., Agricultural and Forest Meteorology, 174-175 (2013) 65-84, discloses the use of computer vision technology to identify leaf emergence and the three-leaf stage.

The detection of specific growth stages of a plant or specific states of growth of particular parts of the plant enables the development rate to be determined, based on the time to reach those specific growth stages or growth states. However, this is not an accurate indicator of whether the plant growth is following an expected trajectory, because many factors influence the growth conditions, such as temperature, irrigation, fertilizers etc.

There is therefore a need for a more accurate automated monitoring system, which can still be implemented with existing simple and reliable technology.

SUMMARY OF THE INVENTION

The invention is defined by the claims.

According to examples in accordance with an aspect of the invention, there is provided a plant growth monitoring system, comprising:
  an image capture system for capturing images over time of a plant being monitored;
  an image processing system for processing the captured images, thereby to derive successive time instants corresponding to predetermined growth states of the plant;
  a temperature monitoring system for monitoring a temperature of the plant or the atmosphere in which the plant is growing;
  a processor adapted to:
    derive a temperature exposure parameter from the monitored temperature between the successive time instants, based on the temperature vs. time function for the time period between the successive time instants; and
    provide information relating to a plant health based on the derived temperature exposure parameter.

The term "growth state" is used to refer to an identifiable growth characteristic, such as the emergence of a new leaf, the formation of a new bud etc. A growth state may even refer to a growth stage of the plant (i.e. sprout, seedling, vegetative, budding, flowering, ripening). However, more typically, the growth states being monitored are separated by a shorter time interval than the generic growth stages of the plant.

The term "plant health" is used to refer to a degree to which a plant growth state corresponds to a desired and feasible growth state. A plant is considered healthy in case its growth state, defined by its physical condition (characterized by quantities such as weight, size, morphology, and color), is within certain limits from the desired and feasible growth state.

The invention is based on the recognition that the temperature function over time is of fundamental and primary significance in assessing if a time period during which a predetermined amount of growth is achieved (i.e. between different growth states) corresponds to a desired health of the plant. Phrased differently, the invention is based on the recognition that plant health can be assessed based on a temperature exposure parameter for a period of time corresponding to the elapsed time between predefined plant states. In examples, as will be discussed in more detail below, these predetermined plant states may be the appearance of new leaves. Therefore, in these example the elapsed time may correspond to the time between the appearance of successive new leaves.

The monitored temperature may be a temperature of the plant itself or of the atmosphere in which the plant is growing. For example the plant stem tip temperature at a relevant location for the growth state, e.g. at the location where new leaves will form, may be important. However, the atmosphere may be monitored as representative of the plant temperature.

This system monitors plant growth states using image analysis. In particular, plant growth states which are reached in a time sequence (such as increase in size, size of leaves, number of leaves, growth of buds, etc.) are detected. The temperature exposure parameter relates to the evolution of temperature between the time points at which those growth states are reached, and relates to both the duration of the time period as well as the temperature. The invention is based on the recognition that a temperature exposure parameter may be derived which correlates with the (normal) growth pattern of the plant. Thus, information relating to the plant health (e.g. compared to a normal growth pattern) may be derived. The invention is for example of interest for use in vertical farming and in greenhouses.

The information relating to plant health may be provided simply as advisory information or it may be used for automated control of the growing conditions.

It has been found that a temperature integral is one parameter which correlates with plant development rate. Thus, it can be used as an indicator of whether the plant development rate is normal or abnormal. The integral includes a temperature offset (which depends on the baseline temperature from which the integral is taken). The integral is of course equivalent to an average temperature over time multiplied by the time duration between the timing instants.

The lighting conditions may further be taken into account within the determination of the temperature exposure parameter. For example, the photoperiod (the number of hours there is light during a day) may be taken into account. The actual lighting level during the periods of lighting may also be taken into account. The amount of light exposure will also influence the plant temperature and have an indirect effect on temperature.

The approach may be applied to plants at any stage of development.

The successive time instants for example comprise timings of the formation of new leaves or new leaves reaching a predetermined size.

For a given stem, the oldest leaves are the lowest leaves on the stem. A new leaf is formed at the tip of a stem. The time instants to be determined are for example the time at the appearance of a new leaf and the appearance of the next new leaf along the same stem. More generally, the time instants are the times at which a new leaf has a certain development state and the next new leaf has the same development state.

The measurements may for example be taken for a number of stems and/or for a number of plants, and an averaged time interval may then be obtained, for which the temperature exposure parameter is derived.

The image processing system is for example adapted to identify the formation of leaves of a predetermined size, and to extrapolate the time back to a time instant corresponding to a smaller or zero leaf size. The detection of leaves of a certain size is more practical, whereas the time instant for the initial leaf formation may be a better parameter for determining the plant health but less practical to detect.

The successive time instants may instead comprise timings of successive side shoot formations or successive flower formations. A temperature exposure parameter can also be defined relation to the formation of new side shoots or the formation of flowers. For example, for tomatoes, there will be formed a new truss of flowers after the formation of three leaves. In this example, the temperature exposure parameter related to the formation of flowering trusses will be a factor of three larger than that related to leaf formation.

The successive time instants may instead comprise timings at which the overall plant reaches predetermined growth conditions. The "growth conditions" may for example relate to a certain number of leaves, shoots, or flowers rather than a physical size. The physical size of a plant is particularly influenced by parameters other than temperature exposure, such as for example the duration of light, light level, level of $CO_2$, etc.

The temperature exposure parameter for example comprise an integral of the temperature over the time between the successive time instants. This provides a measure of the area under the graph of temperature versus time. The baseline for the integral may depend on the plant type. It may for example be in the range 5 to 15 degrees Celsius.

The temperature may be clipped at the baseline temperature, so that if the temperature drops below the baseline, it is set to the baseline. There may also be a maximum temperature such as 30 degrees, for which a simple integral may be used. A more complicated function may be used to tolerate higher temperatures. For example, if $T(t)$ is the temperature function over time and $T0$ is a reference baseline temperature, the temperature integral is the integral of $(T(t)-T0)$ over the time period between the successive timing instants. There are thus two parameters in this model, namely $T0$ and the integral of $(T(t)-T0)$. The value $T0$ may thus be different for different plants.

The processor may be adapted to obtain a reference temperature exposure parameter relating to the plant variety of the plant being monitored and to compare the reference temperature exposure parameter with the derived temperature exposure parameter.

Different plant varieties have a different correlation between the temperature exposure parameter and the development rate, and this is represented by a reference temperature exposure parameter, i.e. the expected temperature exposure related to a desired growth (rate) between the growth states which are being monitored.

The processor may be adapted to determine a degree of deviation from a reference plant health, and may then be further adapted to derive climate adjustment settings in dependence on the deviation. The system may thus be used to provide automatic control of the plant climate, to ensure desired growth characteristics. The climate adjustment settings for example comprise one or more of:
  temperature;
  irrigation settings;
  humidity levels;
  $CO_2$ concentration levels;
  fertilizer dosing; and
  lighting parameters.

These various parameters may be used to influence the plant growth and plant health characteristics.

The invention also provides a horticultural system, comprising:
  a volume in which plants are to be grown;
  a climate and lighting control system for controlling at least the temperature and lighting within the volume; and
  the plant growth monitoring system as defined above.

The invention also provides a plant growth monitoring method, comprising:
  capturing images over time of a plant being monitored;
  processing the captured images, thereby to derive successive time instants corresponding to predetermined growth states of the plant;
  monitoring a temperature of the plant or the atmosphere in which the plant is growing;
  deriving a temperature exposure parameter from the monitored temperature between the successive time instants based on the temperature vs. time function for the time period between the successive time instants; and
  providing information relating to a plant health based on the derived temperature exposure parameter.

The successive time instants for example comprise:
  timings of the formation of new leaves or new leaves reaching a predetermined size;

timings of successive side shoot formations or successive flower formations; or time instants at which the plant reaches predetermined sizes.

The method may comprise identifying the formation of leaves of a predetermined size, and extrapolating the time back to a time instant corresponding to a smaller or zero leaf size.

The temperature exposure parameter for example comprise an integral of the temperature over time between the successive time instants.

The invention also provides a computer program comprising computer program code which is adapted, when said program is run on a computer, to implement the method defined above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
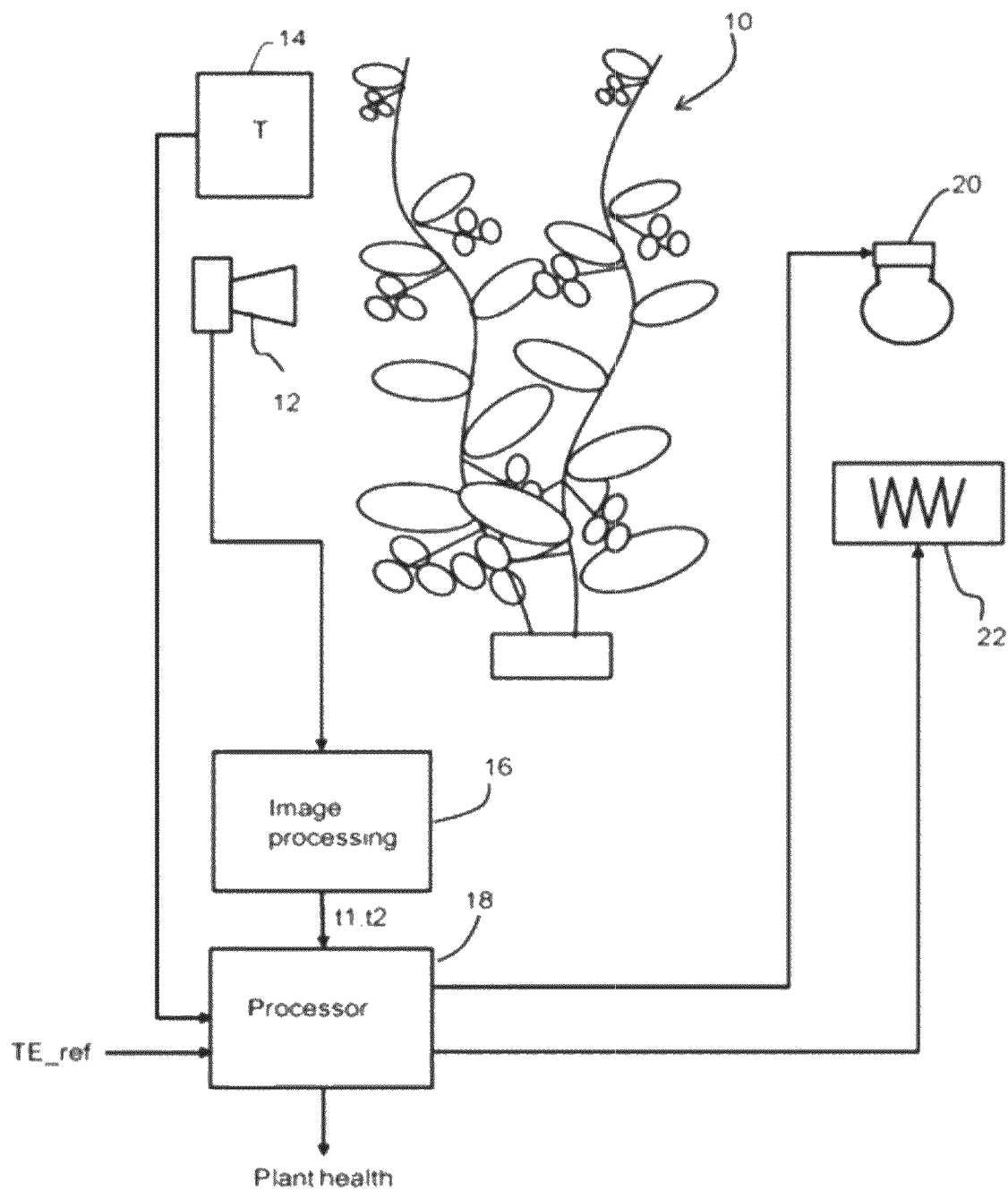
FIG. 1 shows a horticultural system used for the growing of plants.

The invention will be described with reference to the Figures.

It should be understood that the detailed description and specific examples, while indicating exemplary embodiments of the above described apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the figures are merely schematic and are not drawn to scale. It should also be understood that the same reference numerals are used throughout the figures to indicate the same or similar parts.

The invention provides a plant growth monitoring system comprising an image capture system for capturing images over time of a plant being monitored. The images are used to derive successive time instants corresponding to predetermined growth states of the plant. A temperature exposure parameter is obtained for the time period between the successive time instants, based on a monitored temperature vs. time function. Information relating to the plant health is derived from the temperature exposure parameter.

FIG. 1 shows a horticultural system used for the growing of plants, only one plant 10 being represented in FIG. 1. The plants are provided in a volume such as a greenhouse or vertical farming enclosure. The horticultural system is for example employed in controlled-environment agriculture.

In such a system, various variables may be controlled, such as:

Temperature;
Relative humidity;
Carbon dioxide concentration;
Light (intensity, spectrum, duration and intervals);
Nutrient concentration;
Nutrient pH;
Irrigation control (i.e. watering); and
Pest control measures.

The temperature of one or more of the ambient air, of a nutrient solution, of the root-zone or of a leaf may be controlled.

By way of example, FIG. 1 schematically shows a lighting system 20 and a heating system 22. These form part of a climate and lighting control system for controlling at least the temperature and lighting within the volume.

The invention provides a plant growth monitoring system, comprising an image capture system 12 for capturing images over time of the plant 10 being monitored. The image capture system 12 may for example comprise a set of 2D and/or 3D cameras located at different locations (e.g. above a plant, or on the side of a shelf where plants are grown). There is also a temperature monitoring system 14. The monitored temperature may for example simply be the ambient temperature, but also or alternatively surface temperature sensors (such as an infrared temperature sensor) could be used for monitoring leaf temperature, for example.

An image processing system 16 processes the captured images. It derives successive time instants t1, t2 corresponding to predetermined growth states of the plant. The image processing system analyzes the time-series of images received from the image capture system 12 to extract growth information. The aim is to identify when specific growth states are reached. These may relate to the formation or development of individual plant stems, or they may relate to the overall plant development. The growth states may relate to the formation of leaves, side shoots or flowers. The current growth stage of the plant may also be determined (e.g. flowering stage for some types of plants).

The growth states to be identified may for example be based on growth guidelines provided by the user. Examples of such growth guidelines are the expected generation rate of new leaves, the number of leaves present as a function of time, the amount of expected plant pixel coverage in a plant image (for example, on day 3, 50% of the image pixels are expected to be pixels corresponding to the plant or plants).

Instead of user-defined growth guidelines, the system may extract guidelines automatically without requiring input from the user. The system is, in such a case, trained to take into account how a normal growth cycle should be for the plant being monitored, based on, for example, monitoring of multiple simultaneous or successive growth cycles taking place at one or multiple premises with connectivity between premises and the deployment of cloud storage and central processing.

The image processing system may use a trained Deep Learning network, for example trained to count the number of leaves in an image or in time-lapsed images of a plant, or in a set of time-lapsed images where images can contain multiple plants. For an image with multiple plants, the system will be adapted to first separate the different instances of plants and then deal separately with each instance of a plant for counting leaves, for example. Additionally or alternatively, if overall plant growth in a part of a horticulture facility is of interest instead of individual plant growth, the image processing system for example analyzes each image as a whole to monitor plant coverage in comparison to the background, as a measure of growth. In this case, a set of plants may be considered as a single entity.

The growth state monitored by the image analysis may thus be any identifiable growth characteristic, such as the emergence of a new leaf, the emergence of a new side shoot, the formation of a bud, the height of the plant etc. It has been found that two successive growth states can be defined between which a known temperature exposure parameter is expected. This temperature exposure parameter is a measure of the overall temperature exposure of the plant (or a portion of the plant) during a particular time period, and is thus preferably an integral function of the temperature versus time function. The monitored temperature may be a temperature of the plant itself or of the atmosphere in which the plant is growing. For example the plant stem tip temperature at the location relevant to the growth state, e.g. at the location where new leaves will form, may be of importance.

By way of example, for healthy plants of certain types, the number of leaves on the plant depends linearly on the product of temperature and time. The same may also apply to the number of flowers (or flowering trusses). This information can thus be used as a guideline for assessing the health of the plant and/or for identifying how to actuate the climate and lighting control system in order to bring the growth back to the expected growth corresponding with a healthy plant. There may be additional constraints, such as constraints on the use of resources (such as energy used by the lighting or heating system) or constraints on the abilities of the growth system to be taken into account when identifying the climate and lighting control system settings to drive the growth towards the expected growth.

One particularly preferred example is to obtain successive time instants relating to the timings of the formation of new leaves on a same shoot, or equivalently the time instants when new leaves on the same shoot reach a predetermined size.

For a given stem, the oldest leaves are the lowest leaves on the stem. A new leaf is formed at the tip of a stem. The time instants to be determined are for example the appearance of a new leaf and the appearance of the next new leaf along the same stem.

The image processing system may however be used to identify the formation of leaves of a predetermined size, and to extrapolate the time back to a time instant corresponding to a smaller or zero leaf size. Using image processing the detection of leaves of a certain size is more practical and feasible than the detection of initial leaf formation, although the time instants for the initial leaf formation may be a better parameter for determining the plant health.

In all cases, the image processing results in a pair of successive time instants t1, t2, corresponding to the time points at which the pre-defined growth states were identified. Over time, during the overall monitoring period, there will be multiple pairs of successive time instants.

A processor 18 then derives a temperature exposure parameter from the monitored temperature between the successive time instants, based on the temperature vs. time function for the time period between the successive time instants t1, t2. This is a measure which relates to the cumulative temperature exposure of the plant, and hence has at least a component which has units of the product of temperature and time, e.g. degree days.

The processor may also derive additional information. For example, the time periods between successive time instants can also be added together to derive an absolute time (from a start time) of the occurrence of a particular (macro) growth state. This (macro) growth state for example is reached after a longer period of plant development than is monitored between a pair of successive time instants.

The processor and the image processing system may be located on premise or remote, for example based on cloud storage and processing.

The temperature exposure parameter is compared with a reference TE_ref so that information can be derived relating to the plant health.

This information may be provided as an output for advisory purposes (e.g. provided as a wirelessly transmitted data message to a remote unit). Thus, an interface is provided allowing the user to be notified of the growth monitoring output in real-time, and allowing a comparison of the actual growth versus the reference growth in the guidelines. The interface can also provide the user with the automatically generated guidelines and allow the user to modify these guidelines or input metadata that allows the guidelines to be generated and/or annotated in a more controlled/accurate way.

Additionally or alternatively, the information may be used to control the climate and lighting control system 20, 22. This is based on identifying discrepancies between expected growth and realized growth. The mapping from these discrepancies to required steps can either be hardcoded (i.e. provided by the user and stored for later use), or can be identified through a module that analyzes the data from one or multiple facilities and builds a machine learning model that maps input features (such as temperature, light levels, light spectrum, etc.) to output variables, such as development rate in terms of leaf count, leaf generation rate, plant height, etc.).

The reference TE_ref is shown as an input to the processor 18. Of course, it may be stored in a memory. Such a memory may store the sensor data as well as growth guidelines for the particular plant type, i.e. guidelines of how growth is expected to be for the type of plant under consideration. The memory can be cloud storage. The memory can further include a mapping giving the impact of changing the climate and lighting control parameters (e.g. temperature, lighting variables) on the change in growth/development rate.

As mentioned above, the temperature exposure parameter is a cumulative measure. It has been found that a temperature integral is a parameter which correlates reliably with plant development rate. Thus, it can be used as an indicator of whether the plant development rate is normal or abnormal.

The integral provides a measure of the area under the graph of temperature versus time. A baseline temperature may be used as a temperature offset in the integral calculation. A suitable baseline temperature may depend on the plant type and may be indicative of a minimum temperature needed for plant growth. It may for example be in the range 5 to 15 degrees Celsius. If $T(t)$ is the temperature function over time and T0 is the reference baseline temperature, the temperature integral is the integral of $(T(t)-T0)$ over the time period between the successive timing instants. There are thus two parameters in this model, namely T0 and the integral of $(T(t)-T0)$. The value T0 may be different for different plants.

The temperature may be clipped at the baseline temperature, so that if the temperature drops below the baseline, it is set to the baseline. Thus, the temperature exposure parameter is based on the temperature vs. time function for the time period between the successive time instants, but it may be a more complex function than a simple integral (particularly if the temperature may fall outside a range for which the basic integral function is considered to be valid).

There may also be a maximum temperature such as 30 degrees, for which a simple integral may be used. This temperature may be indicative of a maximum temperature above which temperature variations no longer influence plant growth. A yet more complicated function may be used to tolerate higher temperatures.

The lighting conditions may further be taken into account within the determination of the temperature exposure parameter. For example, the photoperiod (the number of hours there is light during a day, e.g., a 24 hour day) may be taken into account. The actual lighting level during the periods of lighting may also be taken into account. The amount of light exposure will also influence the plant temperature and have an indirect effect on temperature.

In any case, the temperature is the dominant effect, and the temperature vs. time function between the time instants is taken into account for assessing plant health. However, additional sensor inputs may also be taken into account in the determination of the temperature exposure parameter and comparison with a reference value.

In all cases, the time intervals between successive growth states may be taken for a number of stems and/or for a number of plants, and an averaged time interval may then be obtained, for which the temperature exposure parameter is derived.

Figure 2:
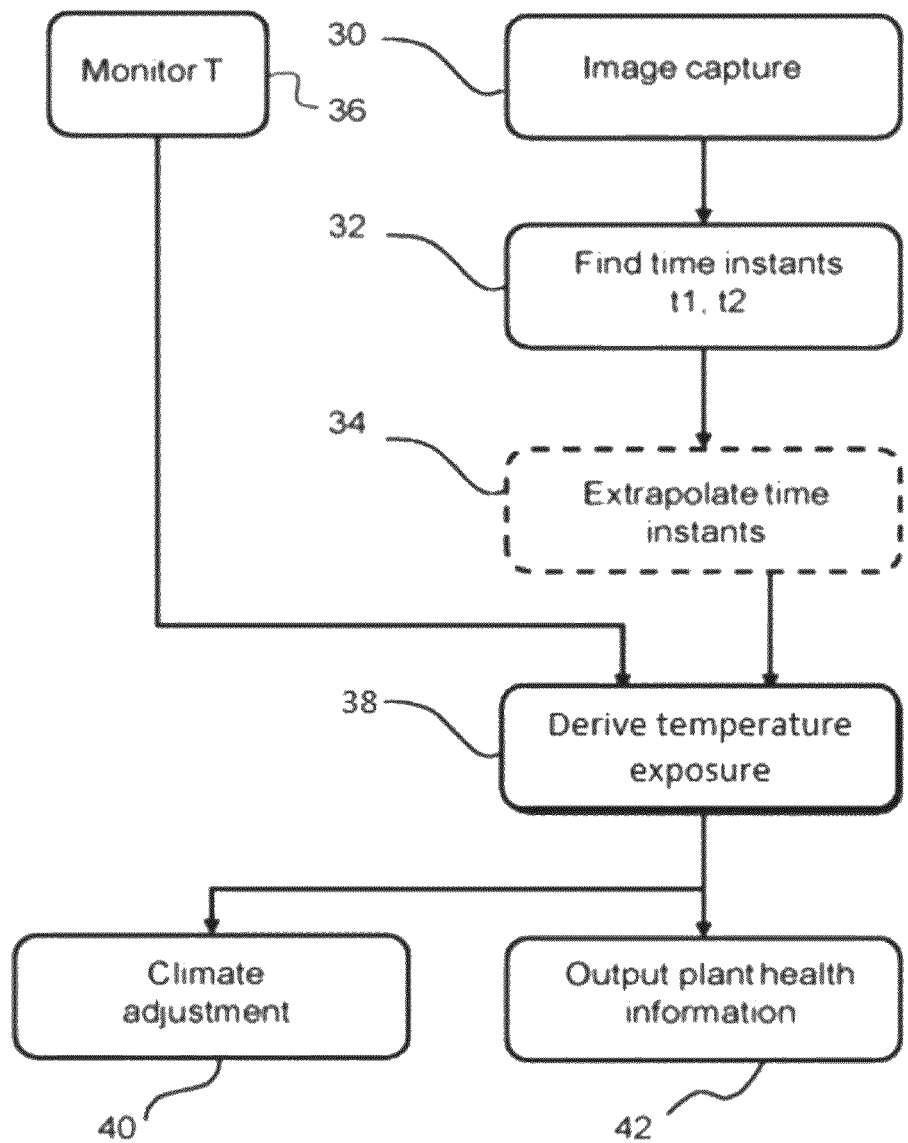
FIG. 2 shows a plant growth monitoring method.

FIG. 2 shows a plant growth monitoring method, comprising in step 30, capturing images over time of a plant being monitored and in step 32, processing the captured images, thereby to derive successive time instants t1, t2 corresponding to predetermined growth states of the plant.

Optionally, step 34 involves extrapolating time values, e.g. from a detected leaf of certain size back to the initial leaf formation.

In step 36, a temperature in respect of the plant is monitored. It is shown in FIG. 2 that this takes place in parallel to the image capture or while the image capture takes place.

In step 38, a temperature exposure parameter is derived from the monitored temperature between the successive time instants based on the temperature vs. time function for the time period between the successive time instants.

Information relating to the plant health is provided based on the derived temperature exposure parameter. This information is used for climate adjustment in step 40 and/or for providing output to a user in step 42.

Image analysis algorithms for detecting plant growth states are known, for example as disclosed in the article of Zhenghong Yu et. al. (see reference above). Such image analysis is for example based on trained machine learning algorithms, using image segmentation and analysis techniques. Further examples are presented in "An automated, high-throughput plant phenotyping system using machine learning-based plant segmentation and image analysis" of Unseok Lee et. al., doi.org/10.1371/journal.pone.0196615 and in KR 2018/0027778.

As discussed above, the system makes use of processors to perform the image processing and the sensor data processing. The processors can be implemented in numerous ways, with software and/or hardware, with a single or multiple processors, to perform the various functions required. A processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A plant growth monitoring system, the system comprising:
    an image capture system for capturing images over time of a plant being monitored;
    an image processing system for processing the captured images, thereby adapted to derive successive time instants corresponding to predetermined growth states of the plant;
    a temperature monitoring system for monitoring a temperature of the plant or the atmosphere in which the plant is growing;
    a processor adapted to:
        derive a temperature exposure parameter from the monitored temperature between the successive time instants, based on a temperature vs. time function for a time period between the successive time instants, the temperature exposure parameter reflecting a cumulative temperature exposure of the plant between the predetermined growth states; and
        provide information relating to a plant health based on the derived temperature exposure parameter.

2. The system as claimed in claim 1, wherein the successive time instants comprise timings of the formation of new leaves or new leaves reaching a predetermined size.

3. The system as claimed in claim 2, wherein the image processing system is adapted to identify the formation of leaves of a predetermined size, and to extrapolate back to a time instant corresponding to a smaller or zero leaf size.

4. The system as claimed in claim 1, wherein the successive time instants comprise timings of successive side shoot formations or successive flower formations.

5. The system as claimed in claim 1, wherein the successive time instants comprise timings at which the plant reaches predetermined growth conditions.

6. The system as claimed in claim 1, wherein the temperature exposure parameter comprises an integral of the temperature over the time between the successive time instants.

7. The system as claimed in claim 1, wherein the processor is adapted to obtain a reference temperature exposure parameter relating to the plant variety of the plant being monitored and to compare the reference temperature exposure parameter with the derived temperature exposure parameter.

8. The system as claimed in claim 1, wherein the processor is adapted to determine a degree of deviation from a reference plant health, and is further adapted to derive climate adjustment settings in dependence on the deviation.

9. The system as claimed in claim 8, wherein the climate adjustment settings comprise one or more of:

temperature;

irrigation settings;

humidity levels;

fertilizer dosing;

CO2 concentration levels; and lighting parameters.

10. A horticultural system, comprising:

a volume in which plants are to be grown;

a climate and lighting control system for controlling at least the temperature and lighting within the volume; and the plant growth monitoring system as claimed in claim 1.

11. A plant growth monitoring method, the method comprising:

capturing images over time of a plant being monitored;

processing the captured images to derive successive time instants corresponding to predetermined growth states of the plant;

monitoring a temperature of the plant or the atmosphere in which the plant is growing;

deriving a temperature exposure parameter from the monitored temperature between the successive time instants based on a temperature vs. time function for a time period between the successive time instants, the temperature exposure parameter reflecting a cumulative temperature exposure of the plant between the predetermined growth states;

providing information relating to a plant health based on the derived temperature exposure parameter; and adjusting the temperature of the atmosphere based on the derived temperature exposure parameter.

12. The method as claimed in claim 11, wherein the successive time instants comprise:

timings of the formation of new leaves or new leaves reaching a predetermined size;

timings of successive side shoot formations or successive flower formations; or time instants at which the plant reaches predetermined sizes.

13. The method as claimed in claim 12, comprising identifying the formation of leaves of a predetermined size, and extrapolating back to a time instant corresponding to a smaller or zero leaf size.

14. The method as claimed in claim 11, wherein the temperature exposure parameter comprises an integral of the temperature over the time between the successive time instants.

15. A non-transitory computer readable medium comprising instructions, the instructions when executed by a computer, cause the computer to perform the method of claim 11.

* * * * *